Oct. 28, 1958  V. KAPENKIN  2,858,091
RETRACTABLE WING AIRPLANE
Filed Jan. 12, 1954  3 Sheets-Sheet 1
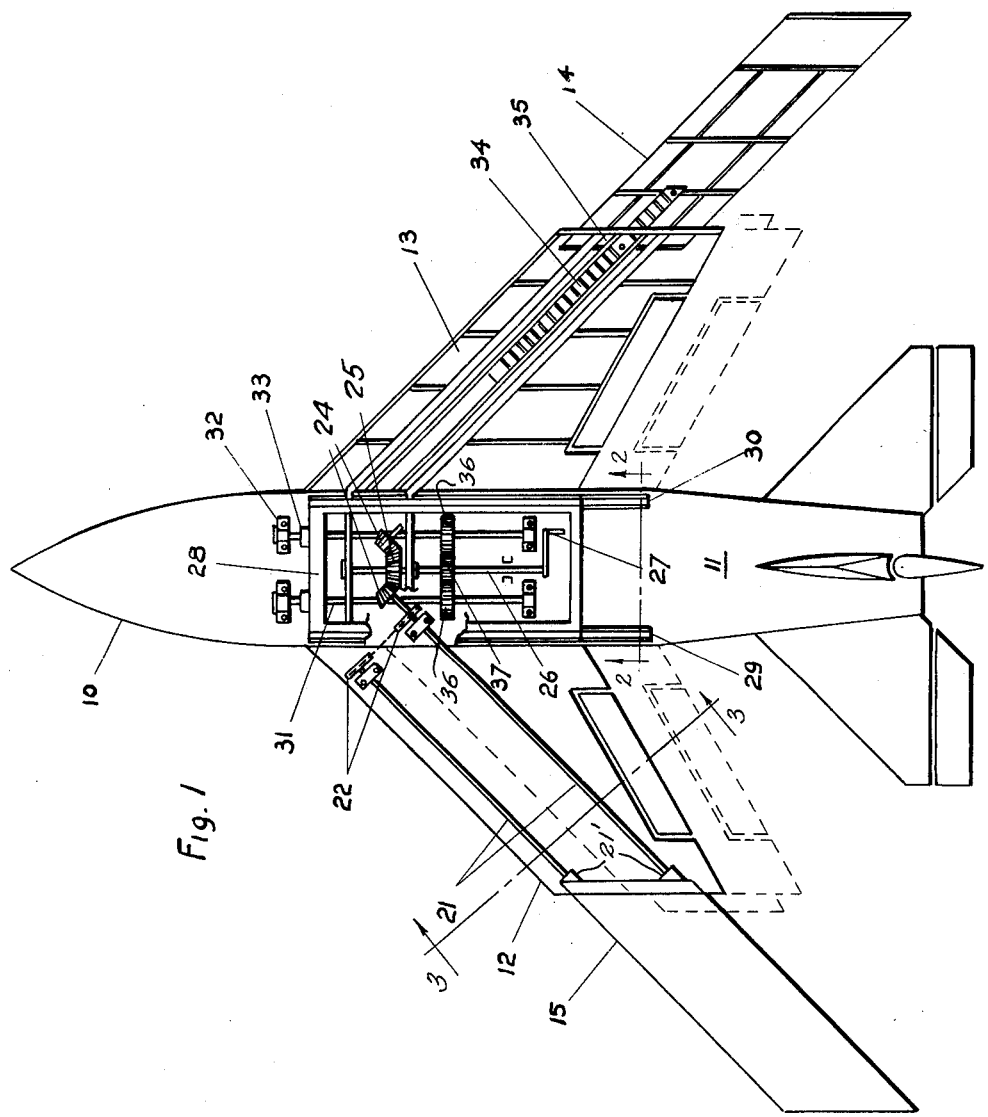
Inventor
Vladimar Kapenkin
By
Attorney

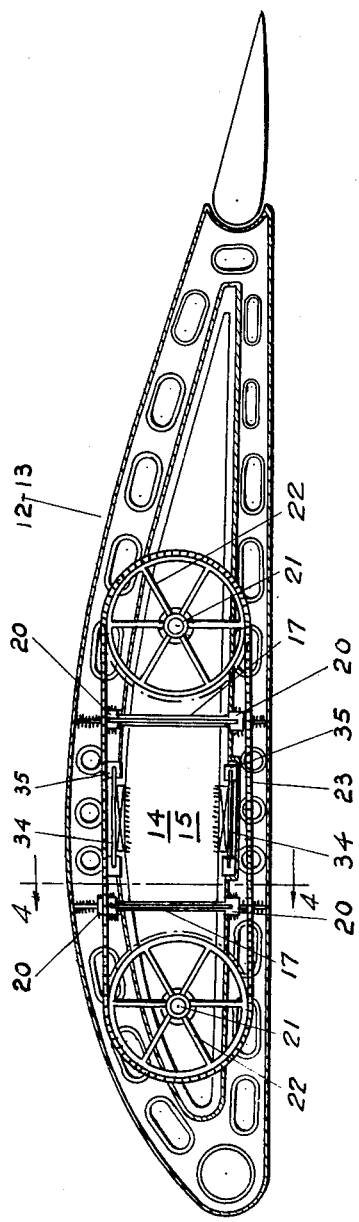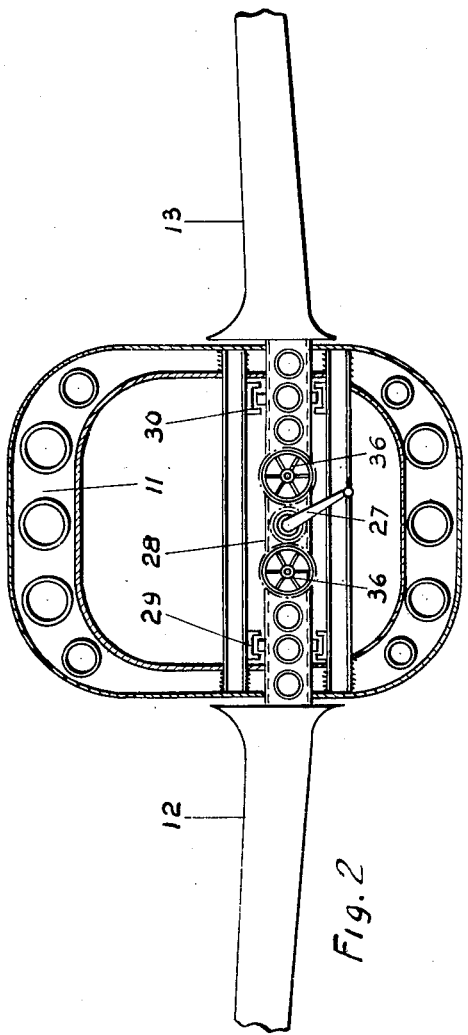

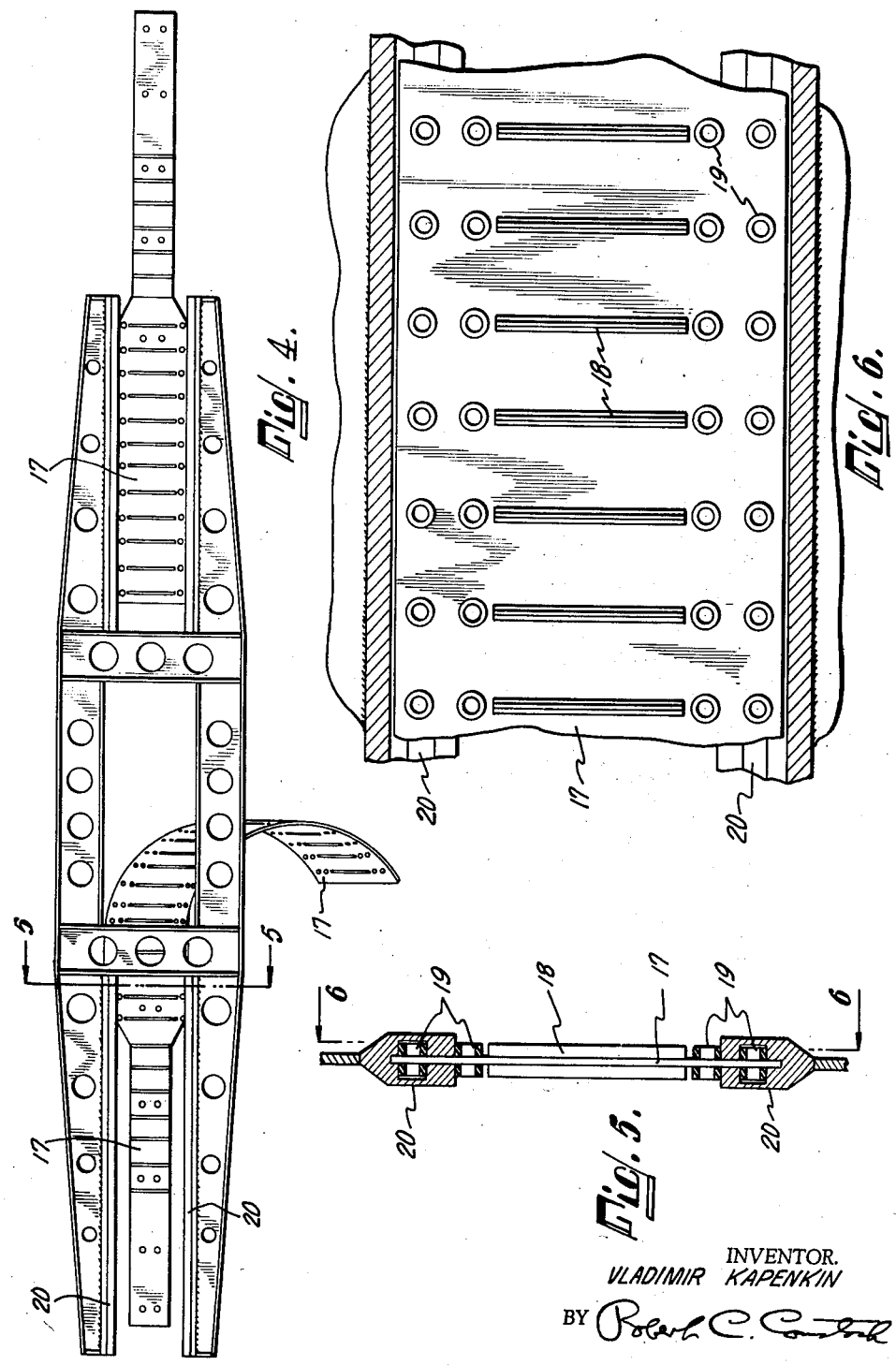

2,858,091

United States Patent Office

Patented Oct. 28, 1958

2,858,091

RETRACTABLE WING AIRPLANE

Vladimir Kapenkin, Los Angeles, Calif.

Application January 12, 1954, Serial No. 403,566

2 Claims. (Cl. 244—43)

This invention relates to an airplane having retractable wings.

It is an object of my invention to provide an airplane having retractable wings which is satisfactory in performance. It is well known that an airplane having retractable wings is highly desirable and offers many advantages. Up to the present time, however, no such airplane has provided satisfactory performance. In all such airplanes, a danger point occurs at the time of landing or takeoff, when the wings might be deformed at the point where they are connected to the airplane. It is an object of my invention to provide an airplane having retractable wings which will not be deformed and which will be perfectly safe to use.

It is particularly an object of my invention to provide such a wing which is attached to one end of a flexible or springing spar, or reinforcing member, the spar being retractable within the airplane.

It is a related object of my invention to provide means for overcoming the shifting of the center of gravity of the airplane which occurs when the wings are expanded or retracted.

In the operation of my invention, the inner end of each retractable wing is attached to one end of a flexible spar, which is a flat spring. The spar is slidably mounted in steel guides which are fastened to the frame of the airplane within the main wings. When the retractable wings are fully expanded, the full length of the spar lies between the guides within the main wings. When the retractable wings are fully retracted, the spar moves within the fuselage of the airplane. Because of its flexibility, the spar can be curved and guided to any desired place within the fuselage.

My invention provides a positive and absolute connection between the retractable wings and the airplane when the retractable wings are fully expanded, regardless of the angle of the wings and even under maximum load conditions resulting from sudden air shocks and motor vibration.

My invention also comprises such other objects, advantages and capabilities as will later more fully appear and which are inherently possessed by my invention.

While I have shown in the accompanying drawings and described herein a preferred embodiment of my invention, it should be understood that the same is susceptible of modification and change without departing from the spirit of my invention.

In the drawings:

Fig. 1 is a top view of an airplane of the present invention, this view being partially broken away so as to illustrate certain structural features;

Fig. 2 is a sectional view taken along line 2—2 of Fig. 1 of the drawings;

Fig. 3 is a sectional view taken along line 3—3 of Fig. 1 of the drawings;

Fig. 4 is a diagrammatic view showing certain features of the invention taken in the general direction of line 4—4 of Fig. 3 of the drawings;

Fig. 5 is a cross-sectional view taken at line 5—5 of Fig. 4 of the drawings; and Fig. 6 is a partial cross-sectional view taken at line 6—6 of Fig. 5 of the drawings.

A preferred embodiment which has been selected to illustrate my invention comprises an airplane 10 having a fuselage 11, a left main wing 12 and a right main wing 13. A right retractable wing 14 and a left retractable wing 15 are adapted to be moved into and out of the main wings 12 and 13.

A pair of flat spring spars or reinforcing members 17 are attached at their outer ends to the inner ends of each of the retractable wings 14 and 15. The spars 17 extend as shown. The inner ends of spars 17 are free from attachment and extend or curl within the fuselage 11 when the retractable wings 14 and 15 are retracted. Each of the spars 16 and 17 is slidably mounted in a pair of guides or tracks 20, which are fastened to the frame of the main wings 12 and 13. Each of the spars 17 is provided with a plurality of transverse ribs 18 for strength.

Mounted adjacent the ends of the ribs 18 are a plurality of studs on which are mounted rollers 19. The rollers 19 engage the sides of a pair of guides or tracks 20, which extend for the entire length of the main wings 12 and 13. The tracks 20 are rigidly attached to the frame of the main wings 12 and 13.

A pair of threaded rods 21 are attached at one end to the inner end of each of the retractable wings 14 and 15 by engaging threaded bushings 21'. The opposite ends of the rods 21 comprise the centers or axes of a pair of rotatable sprockets 22. The sprockets 22 are joined together by a sprocket chain 23. One of the rods 21 for each retractable wing continues past the sprocket 22 to terminate in a pinion gear 24. The pinion gears 24 for the two retractable wings mesh on each side with a center gear 25.

The center gear 25 is mounted on an arm 26, which is rotated by movement of a lever and handle 27. When the handle 27 is rotated, the retractable wings are retracted or expanded, depending upon the direction of rotation of the handle 27. While manual operation is shown and described for simplicity, it should be understood that any form of power operation of my invention may be used.

The inner ends of the main wings 12 and 13 are attached to a main wing frame 28, which is positioned within the fuselage 11. The main wing frame 28 is slidably mounted on a pair of parallel tracks 29 and 30, which extend toward the tail of the airplane and which are attached to the main frame of the airplane 10.

Extending parallel to arm 26 on both sides thereof are two threaded rods 31 on which are mounted gears 36, which mesh with a center gear 37 mounted on arm 26. The ends of rods 31 are supported by thrust bearings 32 and carry nuts 33 which can only move axially and which are attached to the main wing frame 28. When the rods 31 are rotated by movement of the handle 27, the nuts 33 move axially on the rods 31 to move the main wing frame 28 along the tracks 29 and 30.

This forward or reverse movement of the main wings longitudinally with respect to the fuselage is simultaneous and coordinated with the expansion or retraction of the retractable wings in order to overcome the shifting of the center of gravity which results from expansion or retraction of the wings. Otherwise, the center of gravity of the airplane will move forward when the retractable wings are in their outermost position and the airplane will have a tendency to nose-dive.

A pair of horizontal springs 34 are slidably mounted in a pair of parallel guides 35 which are attached to the main wings.

This application is related to my application Serial No.

320,727, filed November 15, 1952 and contains subject matter disclosed therein.

I claim:

1. An airplane including a fuselage, main wings movably attached to said fuselage, means connected to said main wings for moving said main wings longitudinally with respect to said fuselage, retractable wing sections mounted on said main wings at points remote from said fuselage, means connected to said retractable wing sections for moving said retractable wing sections with respect to said main wings, and means connecting said means for moving said main wings and said means for moving said retractable wing sections whereby the movement of said main wings is coordinated with the movement of said retractable wing sections.

2. An airplane as defined in claim 1 wherein said retractable wing sections are attached to flexible reinforcing members, and wherein said flexible reinforcing members are carried within guide means located in said wings.

References Cited in the file of this patent

UNITED STATES PATENTS

| | | |
|---|---|---|
| 1,102,790 | Oliver | July 7, 1914 |
| 1,274,986 | Carolin | Aug. 6, 1918 |
| 2,020,772 | Ellingston | Nov. 12, 1935 |
| 2,172,333 | Theodorsen et al. | Sept. 5, 1939 |
| 2,260,316 | Harris | Oct. 28, 1941 |
| 2,344,044 | Koch | Mar. 14, 1944 |
| 2,465,703 | Allen | Mar. 29, 1949 |
| 2,504,767 | Wallis | Apr. 18, 1950 |
| 2,614,636 | Prewitt | Oct. 21, 1952 |